United States Patent
Petersson et al.

(10) Patent No.: US 8,144,488 B2
(45) Date of Patent: Mar. 27, 2012

(54) VOLTAGE SOURCE CONVERTER STATION

(75) Inventors: Anders Petersson, Ludvika (SE); Lin Jiang, Ludvika (SE)

(73) Assignee: ABB Technology Ltd., Zürich (CH)

( * ) Notice: Subject to any disclaimer, the term of this patent is extended or adjusted under 35 U.S.C. 154(b) by 481 days.

(21) Appl. No.: 12/438,759

(22) PCT Filed: Aug. 25, 2006

(86) PCT No.: PCT/SE2006/000975
§ 371 (c)(1),
(2), (4) Date: Jun. 30, 2009

(87) PCT Pub. No.: WO2008/024038
PCT Pub. Date: Feb. 28, 2008

(65) Prior Publication Data
US 2010/0008111 A1 Jan. 14, 2010

(51) Int. Cl.
*H02J 3/36* (2006.01)
(52) U.S. Cl. .......................... 363/35; 363/39
(58) Field of Classification Search .................. 363/35, 363/39–48
See application file for complete search history.

(56) References Cited

U.S. PATENT DOCUMENTS

| | | | |
|---|---|---|---|
| 4,224,660 A * | 9/1980 | Mohan | 363/48 |
| 4,308,575 A * | 12/1981 | Mase | 363/48 |
| 4,939,486 A * | 7/1990 | Bergdahl et al. | 333/175 |
| 5,831,843 A * | 11/1998 | Lindberg et al. | 363/41 |
| 6,144,567 A * | 11/2000 | Asplund et al. | 363/37 |

FOREIGN PATENT DOCUMENTS

| | | |
|---|---|---|
| EP | 1 174 993 | 1/2002 |
| WO | WO 96/01517 | 1/1996 |
| WO | WO 2005/067118 | 7/2005 |

OTHER PUBLICATIONS

Anders Lindberg, "PWM and Control of Two and Three Level High Power Voltage Source Converters," *Royal Institute of Technology, Department of Electric Power Engineering, Division of High Power Electronics*, Stockholm, Sweden (1995).
International search report, Mar. 27, 2007.
Written opinion of the international searching authority, Mar. 27, 2007.

\* cited by examiner

*Primary Examiner* — Jessica Han
(74) *Attorney, Agent, or Firm* — Venable LLP; Eric J. Franklin

(57) ABSTRACT

The resistors of a filter block \in a voltage source converter station are connected with a floating neutral point.

8 Claims, 3 Drawing Sheets

VOLTAGE SOURCE CONVERTER STATION

CROSS-REFERENCE TO RELATED APPLICATIONS

This application is the national phase under 35 U.S.C. §371 of PCT/SE2006/000975 filed 25 Aug. 2006.

FIELD OF INVENTION

The present invention relates generally to voltage source converters and more particularly to a voltage source converter for use in a high voltage DC (HVDC) system.

BACKGROUND

Voltage source converters (VSC) are used for example in high voltage direct current (HVDC) systems, and also as Static Var Compensators (SVC). In the HVDC application, the voltage source converter is coupled between a direct current link and an alternating current network, and in the second application between a direct voltage source and an alternating current network. In both these applications, the voltage source converter must be able to generate an alternating current (AC) voltage of the same frequency as that of the alternating current network. The reactive and the active power flow through the converter is controlled by modulating the amplitude and the phase position, respectively, of the generated AC voltage in relation to the voltage of the alternating current network.

In particular the coming into being of voltage source converters equipped with series-connected transistors (IGBT) has made it possible to use this type of converters for comparatively high voltages, and pulse width modulation (PWM) for control of the generated AC voltage enables a very fast control of that voltage.

For a general description of controls systems for voltage source converters reference is made to Anders Lindberg: PWM and Control of Two and Three Level High Power Voltage Source Converters. Royal Institute of Technology, Department of Electric Power Engineering. Stockholm 1995, in particular pages 1, 21-56, 77-106, and appendix A, which are hereby incorporated by reference. This document is in the following referred to as Anders Lindberg for short.

FIG. 1 shows in the form of a schematic single line and block diagram a high voltage direct current transmission system as known in the prior art. A first and a second converter station STN1 and STN2 respectively, are coupled to each other via a direct current link having two pole conductors W1 and W2 respectively. Typically, the pole conductors are cables but they may also, at least to a part, be in the form of overhead lines. Although only the first station will be described in detail, it will be appreciated that the second station can be of the same design.

The converter station has capacitor equipment C1 coupled between the pole conductors, and comprises a voltage source converter (in the following VSC) VSC1. The VSC comprises semiconductor valves in a per se known bridge connection, such as, par example, a 2-level or a 3-level converter bridge as described in Anders Lindberg on pages 8-16. The semiconductor valves comprise, in a way known per se, branches of gate turn on/turn off semi-conductor elements, for example power transistors of so-called IGBT-type, and diodes in anti-parallel connection with these elements.

The voltage source converter is via a phase inductor PI1 and line L1 coupled to a three-phase alternating current electric power network N1. Although not shown in the figure, the phase inductor block PI1 also includes filter arrangements, such as a PLC/RI filter for filtering high frequency signals. As shown in the figure, it is well known in the art that the converter may be coupled to the three-phase network via transformers T1, in which case the phase inductors in some cases may be omitted.

When using a VSC comprising switchable semiconductors, such as IGBTs, the switching of the semiconductors introduces harmonic currents on the three-phase side of the VSC. These harmonic currents should preferably be filtered in the VSC station in order to avoid disturbances on the three-phase network N1. To this end, a first filter block F1 is coupled at a connection point between the phase inductor and the three-phase network. This first filter block is Y connected between the three phases and the neutral point is grounded. It will thus provide filtering of zero sequence currents appearing on the three-phase network.

A second filter block F2 is coupled at a connection point between the phase inductor and the three-phase network. This second filter block is ungrounded and Y connected between the three phases and since it is ungrounded, it will only provide filtering of plus and minus sequence currents.

The converter station comprises control equipment (not shown) for generation of trains of turn on/turn off orders to the semiconductor valves according to a predetermined pulse width modulation pattern. A control system for a voltage source converter in an HVDC transmission system is described in the European patent application with publication number EP 1 174 993.

It is desirable to minimize harmonic currents in the resistive part of filters, particularly in filters in very high voltage systems, in order to reduce losses and minimize power rating requirements on the resistors.

SUMMARY OF THE INVENTION

An object of the present invention is to provide a voltage source converter VSC station wherein the power requirements on the filter resistors are minimized.

Another object of the present invention is to provide a VSC station with a reduced number of components, thereby saving space and costs.

The invention is based on the realization that by providing the resistors of the zero sequence current filter block in a VSC station with a common ungrounded electrical zero between phases, harmonic currents therethrough are reduced, in turn resulting in reduced power rating requirements on the resistors.

According to the invention there is provided a voltage source converter station comprising a voltage source converter coupled between a direct current link and an alternating current network in a high voltage direct current transmission system; and a grounded filter block coupled to phase lines between the voltage source converter and the alternating current network for filtering zero sequence current harmonics in the alternating current network; the voltage source converter station being characterized in that the resistive part of the filter block has a common ungrounded electrical zero between phases.

A VSC station is thus provided, wherein the harmonic currents though the resistors are reduced by up to 50-70%, minimizing the power rating requirements on the resistors. Also, by providing a filter having the resistive part ungrounded a band pass filter with high q value for zero sequence harmonics and a low q value for plus and minus sequence harmonics is obtained in one single filter, saving space and costs.

In a preferred embodiment, the voltage source converter is a pulse width modulated converter. The inventive idea is particularly advantageous for topologies wherein the filter is provided between converter plus phase reactor and transformer and for PWM controlled converters, since most PWM technologies generate zero sequence harmonics at the switching frequency of the converter and plus and minus sequence harmonics in the side bands of the switching frequency.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF PREFERRED EMBODIMENTS

Figure 2:
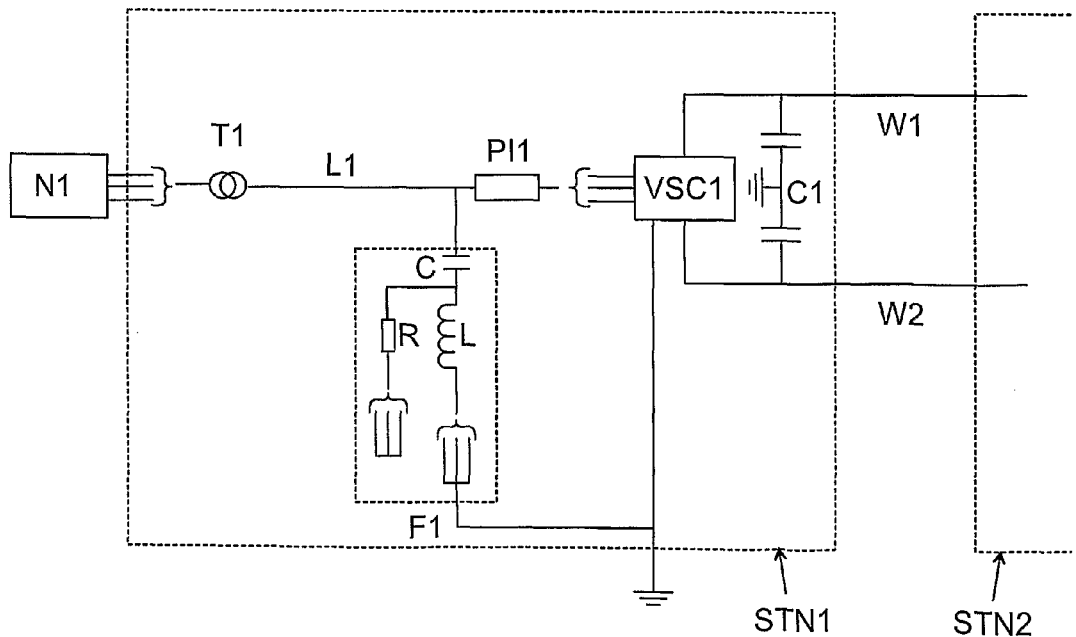
FIG. 2 is a diagram similar to that of FIG. 1 but showing a VSC station according to the invention.

In the following a detailed description of a preferred embodiment of the present invention will be given with reference to FIG. 2. In this description, the term "high voltage" will be used for voltages of 50 kV and higher. Today, the upper limit in commercial high voltage devices is 800 kV but even higher voltages, such as 1000 kV or more, are already built or envisaged in the near future.

The overall structure of the VSC station STN1 according to the invention is similar to that of the VSC station described above in the background section. Thus, the VSC station of FIG. 2 is coupled to a direct current link having two pole conductors W1 and W2 respectively. The converter station has capacitor equipment C1 coupled between the pole conductors, and comprises a voltage source converter VSC1 having semiconductor valves controlled by means of control equipment (not shown). The voltage source converter is via a phase inductor PI1 and line L1 coupled to a three-phase alternating current electric power network N1 via transformers T1.

A filter block F1 is coupled at a connection point between the phase inductor and the transformer T1 connecting to the three-phase network N1. This filter block is Y connected between the three phases like in the prior art but differs in at least one aspect from the prior art filter. The filter block F1 of each phase comprises a capacitor C and an inductor L serially connected between line L1 and ground, wherein the capacitor is connected to line L1 and the inductor to ground. In other words, the LC branches of the filter blocks F1 in the three phases are Y connected with neutral point grounded. This grounding is made relative to the DC side electrical midpoint of the VSC. That is typically in the midpoint of capacitor C1, see FIG. 2. The VSC DC side can be grounded at the same location or not.

Additionally, each phase of filter block F1 comprises a resistor R that in one end is connected to the junction point between the capacitor C and the inductor L and in the other end is connected to a floating neutral point. In other words, the resistors R in the filter blocks F1 of the three phases are Y connected to a common neutral point, which is ungrounded.

Figure 3:
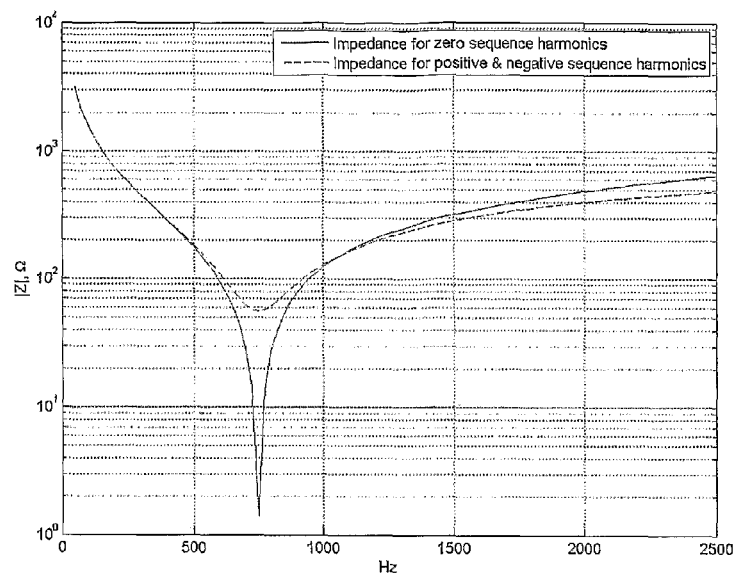
FIG. 3 is a diagram showing the characteristics for a filter comprised in the VSC station of FIG. 2.

An example of the filter characteristics of filter block F1 is shown in FIG. 3, wherein the dashed line denotes the impedance for positive and negative sequence harmonics and the solid line denotes the impedance for zero sequence harmonics.

By providing the serially connected RC circuit between the phase line and a floating neutral point, a filter will be obtained, which is a sharply tuned filter with band pass characteristics for harmonics that constitute zero sequence. For harmonics that constitute positive or negative sequences the filter will be a damped filter with high pass characteristic.

The circuit topology will provide the combination of the two different characteristics without the additional burden of resistor losses related to the filtered zero sequence harmonics as would be the case if resistor shared grounding with reactor.

Figure 1:
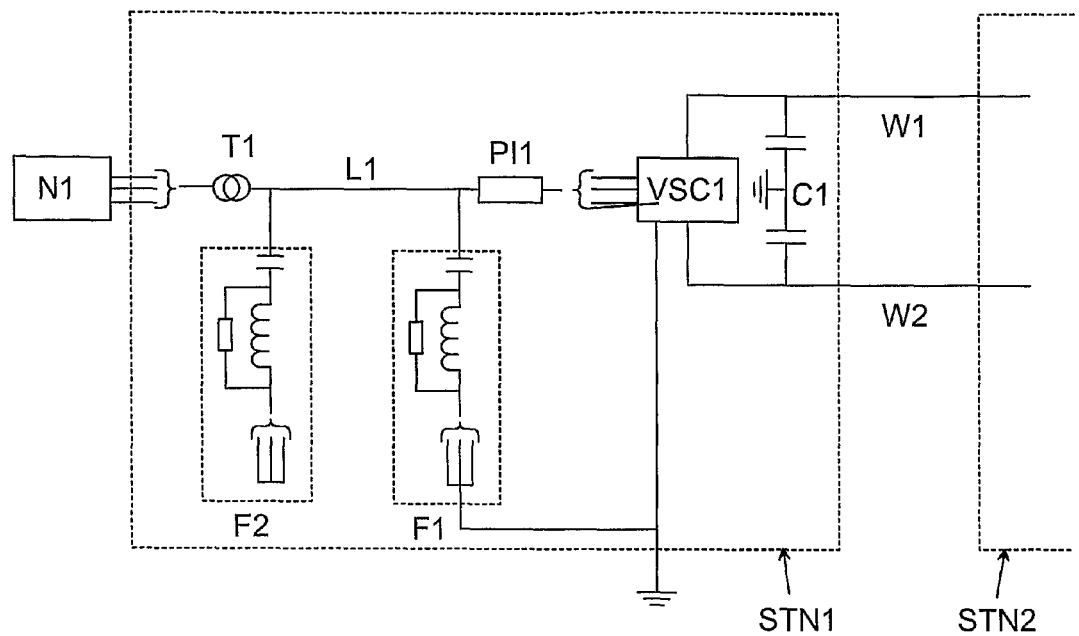
FIG. 1 shows in the form of a schematic single line and block diagram a high voltage direct current transmission system as known in the prior art.
Figure 4:
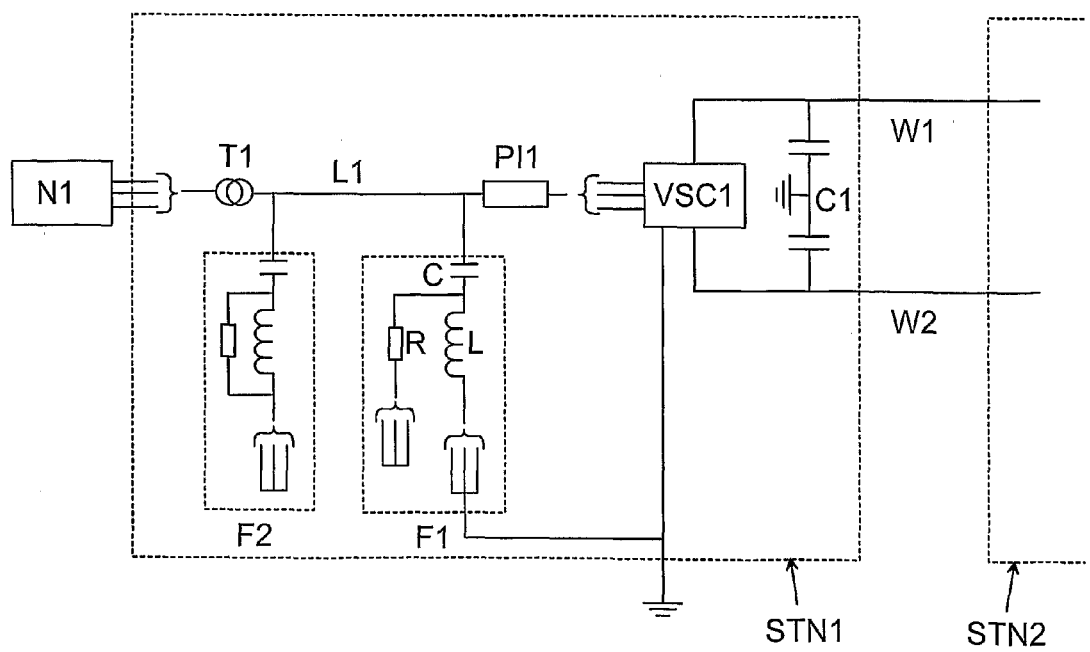
FIG. 4 is a diagram similar to that of FIG. 2 but showing a VSC station according to an alternative embodiment of the invention.

In an alternative embodiment shown in FIG. 4, a second filter F2 is provided in parallel with the filter F1. This second filter has a configuration like the second filter shown in FIG. 1.

Figure 5:
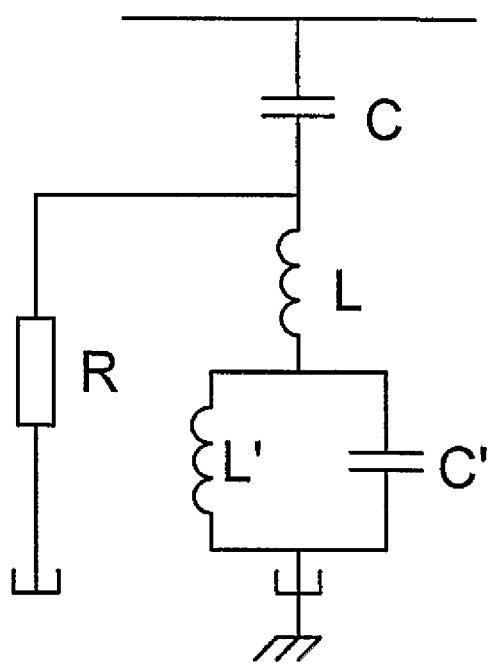
FIG. 5 is a circuit diagram of an alternative filter comprised in a VSC station according to the invention.

An alternative structure for the filter F1 is shown in FIG. 5. This filter is similar to the previously described filter F1 but additionally comprises a second inductor L' and a second capacitor C' connected in parallel with each other and in series with the first capacitor C. This provides for double-tuning of the filter.

Figure 6:
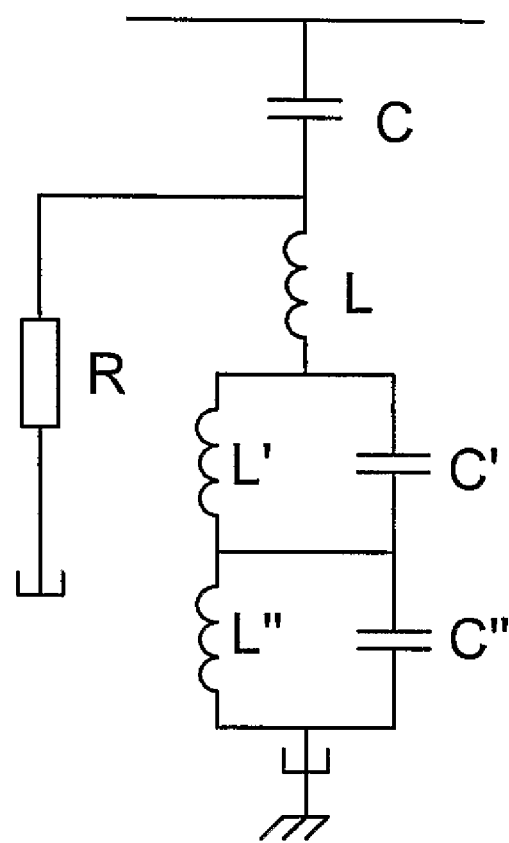
FIG. 6 is a circuit diagram of yet an alternative filter comprised in a VSC station according to the invention.

Yet an alternative structure for the filter F1 is shown in FIG. 6. This filter is similar to the filter of FIG. but additionally comprises a third inductor L" and a third capacitor C" connected in parallel with each other and in series with the capacitor C. This provides for triple-tuning of the filter.

Preferred embodiments of a voltage source converter station according to the invention have been described. A person skilled in the art realizes that these could be varied within the scope of the appended claims. It is realized that the inventive filter configuration is generally applicable as a combined zero sequence band pass filter and positive/negative sequence high pass filter, i.e., is other applications than in a converter station.

The invention claimed is:

1. A converter station, comprising:
a voltage source converter coupled between a direct current link and a three-phase alternating current network in a high voltage direct current transmission system;
a grounded filter block coupled to phase lines between the voltage source converter and the three-phase alternating current network for filtering current harmonics in the alternating current network; and
a resistive part of the filter block comprising a common ungrounded electrical zero between the phases.

2. The converter station according to claim 1, wherein the voltage source converter is a pulse width modulated converter.

3. The converter station according to claim 1, wherein the filter block is coupled at a connection point between a phase inductor and a transformer connecting to the three-phase network.

4. The converter station according to claim 1, wherein the filter block is a tuned filter with band pass characteristics for harmonics that constitute zero sequence harmonics and a damped filter with high pass characteristics for harmonics that constitute positive or negative sequence harmonics.

5. The converter station according to claim 1, wherein the filter block of each phase comprises:
 a capacitor and an inductor serially connected between a phase line and ground, wherein the capacitor is connected to the phase line and the inductor to ground, and a resistor that in one end is connected to the junction point between the capacitor and the inductor and in the other end is connected to a floating neutral point.

6. The converter station according to claim 5, wherein the filter block comprises a second inductor and a second capacitor connected in parallel with each other and in series with the capacitor.

7. The converter station according to claim 6, wherein the filter block comprises a third inductor and a third capacitor connected in parallel with each other and in series with the capacitor.

8. The converter station according to claim 1, further comprising:
 a second filter block connected in parallel with the filter, wherein the second filter block is ungrounded.

* * * * *